(12) United States Patent
Goetzen

(10) Patent No.: US 8,570,447 B2
(45) Date of Patent: Oct. 29, 2013

(54) DIGITAL PICTURE DISPLAY DEVICE

(75) Inventor: Mirko Goetzen, London (GB)

(73) Assignee: Sony Corporation, Tokyo (JP)

( * ) Notice: Subject to any disclaimer, the term of this patent is extended or adjusted under 35 U.S.C. 154(b) by 186 days.

(21) Appl. No.: 12/847,428

(22) Filed: Jul. 30, 2010

(65) Prior Publication Data

US 2011/0058112 A1   Mar. 10, 2011

(30) Foreign Application Priority Data

Sep. 10, 2009   (GB) .................................. 0915903.9

(51) Int. Cl.
*H04N 5/64* (2006.01)
*G09G 3/34* (2006.01)
*G09G 3/36* (2006.01)

(52) U.S. Cl.
USPC ............. 348/836; 348/787; 345/84; 345/204; 345/619

(58) Field of Classification Search
USPC ................ 348/836; 361/681, 679.21; 40/513, 40/299.01; 345/84, 204, 619
See application file for complete search history.

(56) References Cited

U.S. PATENT DOCUMENTS

| | | | | |
|---|---|---|---|---|
| 4,443,959 A | * | 4/1984 | Ackeret | 40/721 |
| 4,458,434 A | * | 7/1984 | Ackeret | 40/513 |
| RE32,528 E | * | 10/1987 | Ackeret | 40/513 |
| D323,324 S | * | 1/1992 | Suda | D14/125 |
| 6,439,520 B1 | * | 8/2002 | Johnson | 248/218.1 |
| D491,902 S | * | 6/2004 | Chen | D14/126 |
| D569,629 S | * | 5/2008 | Yu et al. | D6/308 |
| 7,986,368 B2 | * | 7/2011 | Lin et al. | 348/373 |
| 2007/0181771 A1 | * | 8/2007 | Alcov | 248/466 |
| 2008/0163524 A1 | * | 7/2008 | Broehl et al. | 40/299.01 |
| 2008/0247127 A1 | * | 10/2008 | Finnegan | 361/681 |
| 2009/0219245 A1 | * | 9/2009 | Frankel et al. | 345/104 |

FOREIGN PATENT DOCUMENTS

| | | |
|---|---|---|
| GB | 2 073 147 A | 10/1981 |
| GB | 2 099 792 A | 12/1982 |
| WO | WO 2009/061609 A1 | 5/2009 |

* cited by examiner

*Primary Examiner* — Joseph Ustaris
*Assistant Examiner* — On S Mung
(74) *Attorney, Agent, or Firm* — Oblon, Spivak, McClelland, Maier & Neustadt, L.L.P.

(57) ABSTRACT

A digital display device including an electronic display screen. The device has a frame and a support extendable rearward from the digital display device. The support includes a corner portion and two elongate members extending from the corner portion in two substantially mutually perpendicular directions to respective mounting portions. The mounting portions are hinged respectively to two adjacent sides of a rear face of the frame along a common axis and at respective positions allowing the elongate members to fold flat to the rear face of the frame.

12 Claims, 4 Drawing Sheets

DIGITAL PICTURE DISPLAY DEVICE

CROSS-REFERENCE TO RELATED APPLICATIONS

This application is based upon and claims the benefit of priority from British Application No. 0915903.9 filed 10 Sep. 2009, the entire contents of which are incorporated by reference.

BACKGROUND OF THE INVENTION

1. Field of the Invention

The present invention relates to a digital picture display device, in particular to a digital picture display device having a support extendable rearwardly from the digital picture display device and a method of supporting a digital picture display device.

2. Description of the Related Art

Picture frame assemblies are well known for displaying pictures such as photographs or paintings. They includes a main body for supporting the picture and a frame surrounding the picture. A glass or acrylic sheet may be provided to fill the opening defined in the front face by the frame so as to protect the picture.

One or more hooks may be provided on the rear face of the frame assembly such that it may be hung on a wall. Also, it is known to provide various types of hinged support on the back face of the assembly. The hinged support may be pivoted outwardly from the rear face so that the assembly can be stood in a generally upright manner on a horizontal surface, such as a table. In some arrangements, the support allows the assembly to be stood in two mutually perpendicular orientations, for instance with the picture in a landscape or in a portrait orientation.

JP 2005-205146 and JP 2005-237914 are examples of frame assemblies known in the prior art.

In recent times, it has been known to provide a similar frame assembly in which the traditional photograph or painting is replaced by an electronic display screen. Processing components are required to drive the electronic display screen and these must be housed in the frame assembly, thereby adding to the overall thickness of the frame assembly.

OBJECTS AND SUMMARY OF THE INVENTION

The present invention is based at least partly on a recognition that it is undesirable to provide the hinged support on the rear face of the housing of the processing components, because this adds still further to the overall thickness of the frame assembly. The present invention is also based on a recognition of problems with providing prior art supports only on the periphery of the frame assembly, in other words on the rear face of the frame outwardly of the housing for the processing components.

According to the present invention, there is provided a method of supporting a digital picture display device having an electronic display screen with a front face and a rear face, the front face being configured to display images, a component housing holding processing components for driving the electronic display to display images, the housing being positioned at the rear face of the electronic display screen and a frame having a front face with four respective sides together surrounding the front face of the electronic display screen and having a rear face with four corresponding respective sides together defining an opening through which said component housing extends rearwardly from the electronic display screen. The method includes providing, as a support, two elongate members extending from a corner portion in two substantially mutually perpendicular directions to respective mounting portion and hinging the mounting portions respectively to two adjacent sides of the rear face of the frame along a common axis and at respective positions so as to allow the elongate members to fold flat to the rear face of the frame alongside the component housing.

According to the present invention, there is also provided a digital picture display device. The digital picture display device includes an electronic display screen having a front face and a rear face, the front face being configured to display images, a component housing holding processing components for driving the electronic display screen to display images, the housing being positioned at the rear face of the electronic display screen, a frame having a front face with four respective sides together surrounding the front face of the electronic display screen and having a rear face with four corresponding respective sides together defining an opening through which said component housing extends rearwardly from the electronic display screen, and a support extendable rearwardly of the digital picture display device. The support includes a corner portion and two elongate members extending from the corner portion in two substantially mutually perpendicular directions to respective mounting portions, the mounting portions being hinged respectively to two adjacent sides of the rear face of the frame along a common axis and at respective positions allowing the elongate members to fold flat to the rear face of the frame alongside the component housing.

In this way, a relatively large and strong support can be provided without increasing the overall thickness of the digital picture display device. With the support hinging from two mounting portions and having two elongate members joining at the corner portion, a strong structure is provided for the support. Also, the support extends in two substantially mutually perpendicular directions along two adjacent sides of the frame such that one of the elongate members can be used to rest on a mounting surface, such as a table, with the digital picture display device in one orientation and the other of the two elongate members can rest on that mounting surface with the digital picture display device in another, perpendicular, orientation.

With the mounting portions arranged along two adjacent sides of the frame, the support necessarily hinges away from the frame at an angle to both of those adjacent sides. As a result, neither of the two elongate members will hinge relative to the rear face of the frame in an orthogonal direction. Thus, naturally, when the support is used to support the digital picture display device on a mounting surface, such as a table, the digital picture display device will be angled rearwardly, irrespective of which of the two elongate members rests on the mounting surface. In this way, the digital picture display device is supported on the mounting surface in a stable manner.

In a conventional manner, the four respective sides of the frame include two pairs of substantially parallel sides with each pair of parallel sides substantially perpendicular to the other pair of parallel sides. Each side meets an adjacent side at a corner.

Each elongate member may be substantially the same length as the respective adjacent side of the rear face against which the elongate member folds flat and the common axis is a diagonal of the frame.

In this way, each of the two elongate members has the full length of its corresponding side of the frame and provides maximum support to the digital picture display device.

The corner portion of the support folds flat to the corner between the two adjacent sides of the frame.

The two mounting portions are located at respective diagonally opposite corners of the frame such that the axis extends diagonally between those two opposite corners of the frame.

In some embodiments, the support may be hinged or pivoted outwardly from the rear of the digital picture display device by only a small angle whilst providing a relatively large distance between the corner portion of the support and the rear face of the frame. In this way, significant support may be provided to the digital picture display device when resting on a mounting surface with the support angled away from the frame by only a small angle. Also, as a result, the front face of the digital picture display device need, in this way, only be tipped rearwardly by a small angle.

In some embodiments, the rear face of the frame has a width extending from the component housing to an outer periphery and the elongate members may have substantially the same width.

The overall outer length and width dimensions of the digital display device will be the outer periphery of the frame. The component housing is of smaller length and width dimensions, but of greater thickness and, hence, extends rearwardly through the opening defined by the rear face of the frame. By setting the width of the elongate members to the same width of the frame, namely the distance between the component housing and the outer periphery, the support may be provided with maximum rigidity and strength. This arrangement of the support has the additional benefit of fitting neatly with the dimensions of the rear face of the frame so as to improve the overall appearance of the device.

In some embodiments, the frame has a thickness extending from the front face of the frame to the rear face of the frame. The elongate members may have a corresponding support thickness. The thickness of the frame along the adjacent sides of the rear face of the frame against which the elongate members fold flat may be less than the thickness of the frame elsewhere by an amount corresponding to the support thickness.

In this way, when the support is folded flat against the rear face of the frame, the rear face of the support is coplanar with the rear face of the frame that the support does not fold against. In the folded state, the support thus appears to be merely a continuation of the rear face of the frame, thereby improving the overall appearance of the device.

In some embodiments, the device may further include a mechanism for securing the elongate members at one or both of a position folded flat to the rear face of the frame and a position hinged at an angle away from the rear face of the frame.

In other words, the support may be secured flat against the rear face of the frame. It may alternatively or additionally be secured in a hinged state whereby the support can be used to hold the digital picture display device upright on a mounting surface such as a table.

The mechanism may include a detent clip in at least one of the mounting portions.

In this way, the support may hinge freely between a folded position and an extended position, but may clip into one or both of the folded and extended positions.

The mechanism may include an over-centre mechanism in at least one of the mounting portions.

In this way, the support may be biased or sprung towards the folded position and the extended position. A user may pull the support away from one position against the bias and, by virtue of the over-centre mechanism, beyond a certain intermediate position, the bias will then move the support securely into the other position.

In some embodiments, the mounting portions may be arranged to allow the corner portion of the support to pivot around the hinged mounting portions to a position rearwardly beyond the component housing.

In this way, although the component housing protrudes rearwardly beyond the rear face of the frame and the support is hinged to the frame, the support is able to pivot outwardly to a position extending beyond the component housing and thereby give greater support to the digital picture display device when standing on a mounting surface such as a table.

Although the digital picture display device of the present invention is usefully embodied in what might commonly be termed as an ornamental frame for housing pictures such as photographs, it could also be embodied in items such as cameras, mobile telephones, television devices and portable game devices, as well as audio, audio/visual mobile players. It can similarly be embodied in what might be described as a "lifestyle" mobile device, namely a device, for instance for use in the home, taking the form of a touchscreen photoframe and including functionalities such as rss reader, online shareable calendar, mp3 player, etc.

DETAILED DESCRIPTION OF THE PREFERRED EMBODIMENTS

The invention will be more clearly understood from the following description, given by way of example only, with reference to the accompanying drawings.

The present invention will be described with reference to a digital picture display device taking the form of an ornamental frame.

Figure 1:
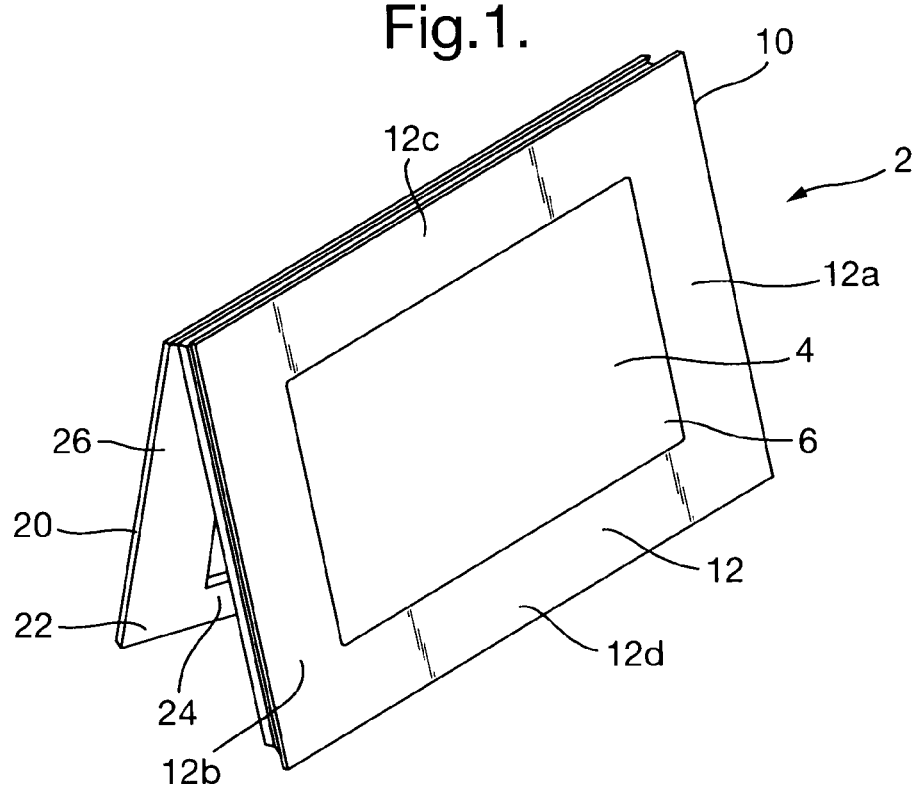
FIG. 1 illustrates a front perspective view of a display device embodying the present invention.

FIG. 1 illustrates a display device 2 embodying the present invention.

The display device 2 includes a display screen 4 having a front face 6 as illustrated in FIG. 1 for displaying images. A rear face of the display screen is provided internally of the display device opposite the front face 6 and is not visible in the Figures.

Figure 2:
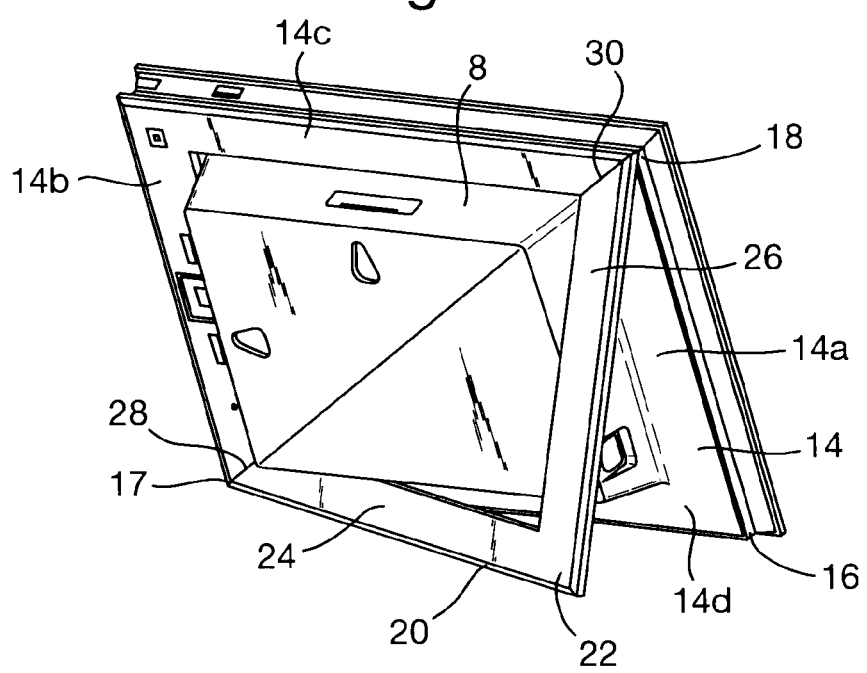
FIG. 2 illustrates a rear perspective view of the display device of FIG. 1.

As illustrated in FIG. 2, a component housing 8 is provided at the rear of the display device 2. It is positioned at the rear face of the electronic display screen 4 and hence conceals that rear face.

The component housing 8 is merely a casing for any processing components required for driving the electronic display screen 4 to display images. It may additionally house components such as a memory for storing data for the images to be displayed and also a power source, such as a battery. It may have a wireless receiver module so that images can be received remotely from other devices such as mobile phones, cameras and computers.

Sockets and connectors may be provided in the walls of the component housing 8 so as to allow connection of external devices including, for instance, memory components and power sources.

As illustrated, the display device additionally includes a frame 10.

The frame 10 includes a front face 12 which surrounds the front face 6 of the electronic display screen 4. In particular, the front face 12 has four respective sides 12a, 12b, 12c and 12d, which together surround the front face 6 of the electronic display screen 4. The sides may be arranged as a pair of substantially parallel sides 12a, 12b substantially perpendicular to another pair of substantially parallel sides 12c and 12d with the four respective sides joining at four respective corners.

The frame 10 also forms a rear face 14 with corresponding respective sides 14a, 14b, 14c and 14d. The sides of the rear face correspond to the sides of the front face. Hence, they may be formed as a pair of substantially parallel sides 14a, 14b arranged substantially perpendicular to a pair of substantially parallel sides 14c and 14d.

The rear sides of the frame 10 in effect define an opening through which the component housing 8 extends rearwardly. However, it should be noted that at least some of the rear sides of the frame 10 can be formed integrally with the walls of the component housing 8. Thus, for the example illustrated in FIG. 2, the walls of the component housing 8 extend continuously with the two adjacent rear side walls 14a and 14d of the frame 10. In this illustrated embodiment, the two opposites adjacent rear side walls 14b and 14c of the frame 10 are formed as separate component parts. However, these opposite adjacent sides 14b and 14c could be formed continuously with (and integrally with) the walls of the component housing 8 in the same manner as the sides 14a and 14d.

Attention is now drawn to the provision of a support 20 hinged to the rear of the display device 2.

As illustrated in FIG. 2, the support 20 includes a corner portion 22 and two elongate members 24 and 26. The elongate members 24 and 26 extend from the corner portion 22 in two substantially mutually perpendicular directions. In particular, they extend to respective mounting portions 28 and 30. At the mounting portions, the support 20 is mounted in a pivotable manner to the rear face 14 of the frame 10 so as to be hinged therewith.

Figure 3:
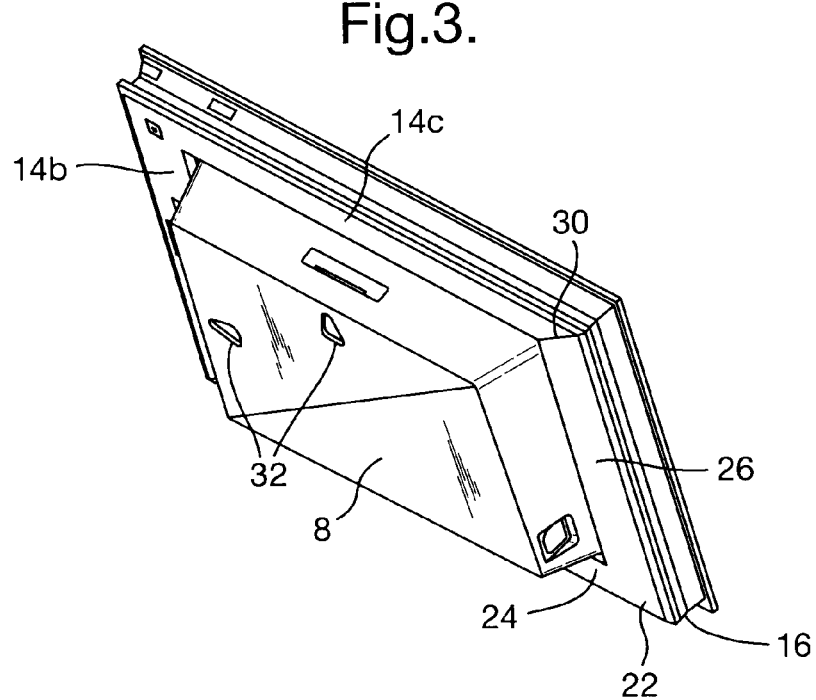
FIG. 3 illustrates a rear perspective view of the display device of FIG. 1 with its support in a folded position.

FIGS. 1 and 2 illustrate the support in an extended position and FIG. 3 illustrates the support 20 in a folded position in which the support 20 is folded flat against the rear face 14 of the frame 10. In this respect, it will be appreciated that the two mounting portions 28 and 30 hinge around a common axis. In the folded position, the corner portion 22 of the support 20 is arranged to be positioned against a corner 16 between the two adjacent sides 14a and 14d.

With the support 20 in its folded position as illustrated in FIG. 3, the display device 2 may easily be transported, for instance between friends sharing images and passing images between each other. Also, with the support 20 in this position, it is possible to mount the display device against a vertical surface such as a wall, for instance using wall mounts 32 in the component housing 8.

Figure 4:
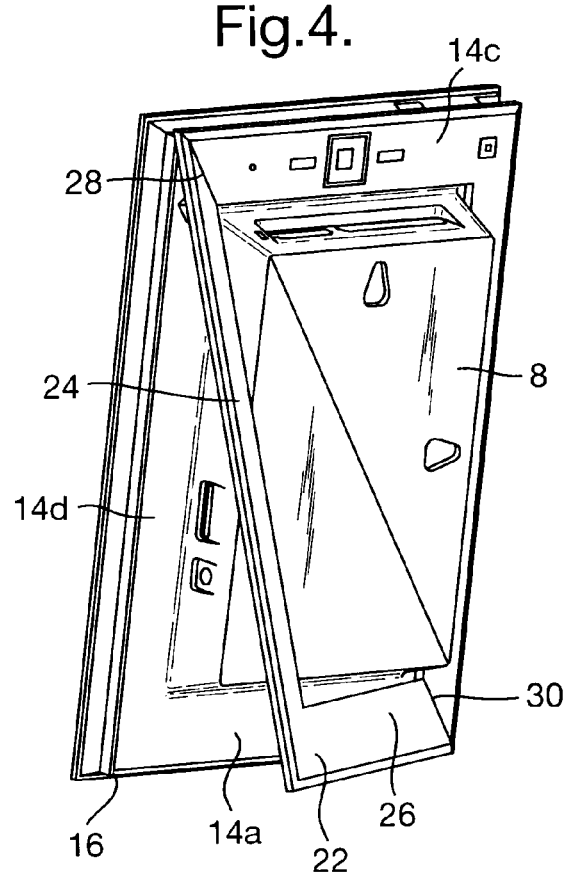
FIG. 4 illustrates a rear perspective view of the display device of FIG. 1 in an alternative orientation.

With the support 20 in its extended position illustrated in FIG. 2, the display device may be stood on a horizontal mounting surface, such as a tabletop with the front face of the display device tilted slightly rearwardly and the support 20 supporting the display device. Alternatively, with the support 20 in the same extended position, the display device can be rotated by 90 degrees as illustrated in FIG. 4.

As illustrated in FIG. 2, the elongate arm 24 of the support 20 is provided to rest upon a mounting surface with the electronic display screen 4 arranged in a landscape orientation. In contrast, having rotated the display device 2 by 90 degrees as illustrated in FIG. 4, the other elongate arm, namely elongate arm 26 is provided to rest on a mounting surface. The display device 2 is thus supported on a horizontal surface, such as a tabletop with the electronic display screen 4 having a portrait orientation.

In the illustrated embodiment, the mounting portions 28 and 30 are provided at respective corners 17 and 18 of the frame 10 such that the axis about which the support 20 hinges extends along a diagonal of the frame 10 between those two corners and the elongate arms 24 and 26 extend along the full length of the corresponding sides 14d and 14a of the rear face 14 of the frame 10.

In this way, maximum use is made of the length of the frame 10 along its two perpendicular sides for providing the support 20. A relatively large support 20 may thus be provided. Because of the length of the elongate arms 24 and 26, the support 20 need only pivotal hinge by a relatively small angle at the mounting portions 28 and 30 in order for the support 20 to move rearwardly by a significant amount. In particular, it is preferable that the corner portion 22 move rearwardly from the rear face 14 of the frame 10 beyond the furthest extent of the component housing. In this way, it can be ensured that the centre of gravity of the display device (usually found within the component housing) is forward of the rearmost part of the extended support 20.

It should be noted, however, that it is also possible to provide the mounting portions for the support at positions intermediate along the lengths of the sides 14a and 14d. This merely results in shorter elongate arms and the requirement for a greater hinging amount when the support is in its extended position.

Each elongate arm 24, 26 has a length extending between the corner portion 22 and the corresponding mounting portion 28, 30. Each elongate arm also has a thickness measured in a rearward/forward direction and a width. As illustrated, the width of the elongate arms corresponds to the distance between the component housing 8 and the outer periphery of the frame 10. In this way, the strength of the support 20 may be maximised for the space available. An additional benefit is that the support 20, in its folded position, rests neatly against the rear face 14 of the frame 10 so as to provide a neat appearance to the display device 2. Of course, it is also possible to provide embodiments having supports with elongate arms of reduced width.

In the illustrated embodiment, the total thickness of the frame 10 (as measured in a rearward/forward direction) is less along the sides 14a and 14d than along the sides 14b and 14c. The difference in thickness may be substantially the same as the thickness of the elongate arms 24 and 26. In this way, when the support 20 is in its folded position with the elongate arms 24 and 26 folded flat against the sides 14a and 14d of the frame 10, then the most rearward surfaces of the elongate arms 24 and 26 are coplanar with the rear face of the frame 10 along the sides 14b and 14c. This provides a very neat appearance to the display device.

In the illustrated embodiment, the additional thickness to the frame 10 along the sides 14b and 14c is provided by an additional component, similar in size and shape to the support 20 having two elongate members extending from a corner in two substantially mutually perpendicular directions. However, it should be appreciated that the frame 10 could be formed by components that themselves intrinsically have greater thickness in the regions of sides 14*b* and 14*c*.

The mounting portions 28 and 30 may be provided in any known manner so as to securely pivotably mount the support 20 to the frame 10.

In one embodiment, at least one of the mounting portions 28 and 30 includes at least one element to restrict the amount by which the support 20 may hinge at that mounting portion. In this way, the mounting portion 20 can move freely between an extended position and the folded position, but is not able to rotate beyond the extended position. The display device may thus be stood securely on a mounting surface in either of the positions illustrated in FIGS. 2 and 4.

It is alternatively or additionally possible to provide clip and/or detent features in one or both of the mounting portions 28 and 30 which clip the support into one or both of the extended and folded positions.

Is also possible to provide one or both of the mounting portions 28, 30 with an over-centre arrangement which biases the support 20 selectively to both its extended position and its folded position. A user pulls the support 20 away from one position against the bias of the over-centre arrangement until the support passes a mid-position at which the bias of the over-centre arrangement biases the support 20 to the other position.

Figure 5:
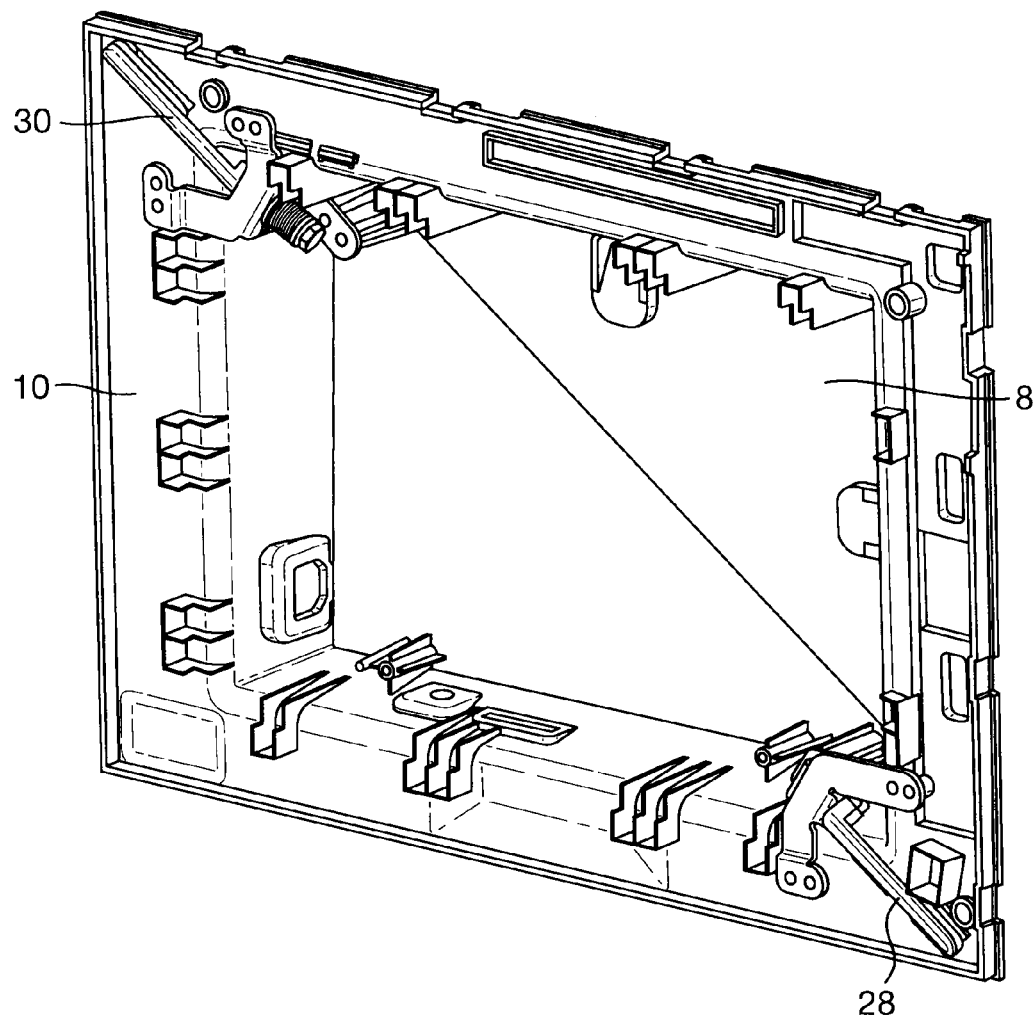
FIG. 5 illustrates inside part of a display device.

FIG. 5 illustrates the rear section of a display device showing the inside (and empty) part of the component housing 8 as well as the rear part of the frame 10 which surrounds it. Also illustrated are examples of mounting portions 28 and 30.

Figure 6A:
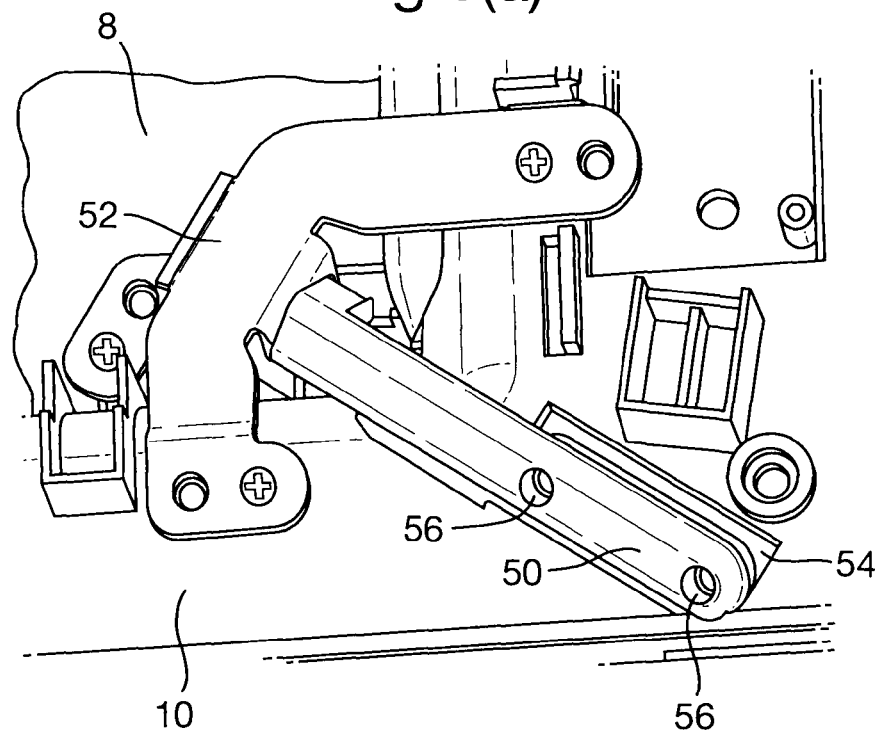
FIGS. 6(*a*) and (*b*) illustrate mounting portions of the display device of FIG. 5.
Figure 6B:
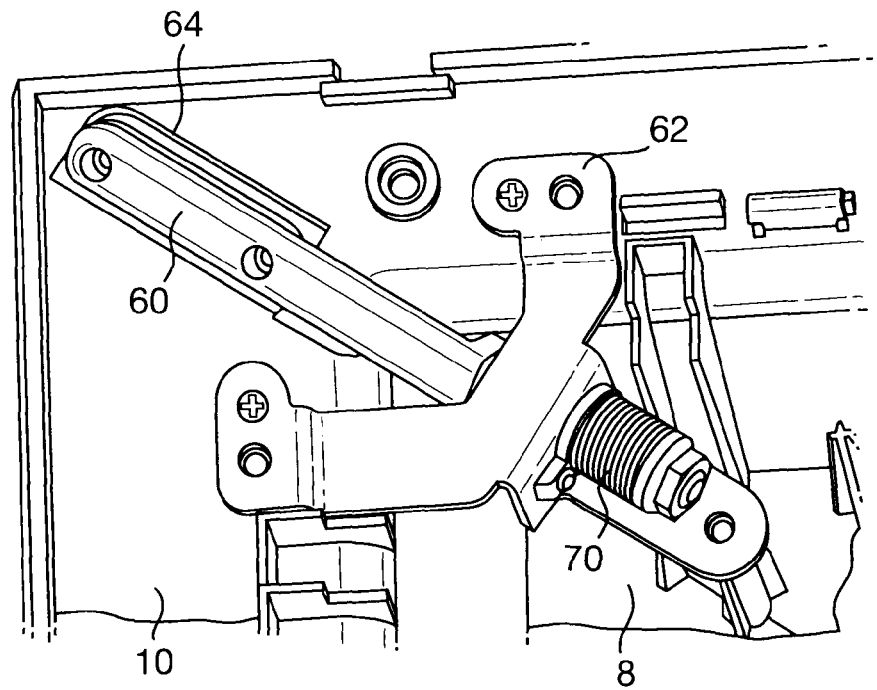

Mounting portion 28 is illustrated in greater detail in FIG. 6(*a*). A rotatable arm 50 is mounted pivotably to a bracket 52, which is in turn mounted to the component housing 8 and/or frame 10. The frame 10 defines a small opening 54 into which the rotatable member 50 extends. The support may be attached in any convenient manner to the member 50. As illustrated, holes 56 are provided, for instance for receiving screws.

FIG. 6(*b*) illustrates in greater detail the mounting portion 30. Similarly, the mounting portion 30 as illustrated includes a rotatable member 60, a bracket 62 and an opening 64 in the frame 10.

In this particular illustrated embodiment, a torsion spring 70 is also provided on the bracket 62 engaging with the rotatable member 60. In particular, rotation of the arm 60 is arranged to rotate the torsion spring 70. In this way, the torsion spring 70 can be used to bias rotation of the member 60 and the corresponding support 20. The torsion spring 70 can be used to bias the support either to its folded position or to its extended position.

I claim:

1. A digital display device including:
   an electronic display screen having a front face and a rear face, the front face being configured to display images;
   a component housing holding processing components for driving the electronic display screen to display images, the housing being positioned at the rear face of the electronic display screen;
   a frame having a front face with four respective sides together surrounding the front face of the electronic display screen and having a rear face with four corresponding respective sides together defining an opening through which said component housing extends rearward from the electronic display screen; and
   a support extendable rearward from the digital display device; wherein:
   the support includes a corner portion and two elongate members extending from the corner portion in two mutually perpendicular directions to respective mounting portions, the mounting portions being hinged respectively to two adjacent sides of the rear face of the frame along a common axis and at respective positions allowing the elongate members to fold flat to the rear face of the frame alongside the component housing, and
   the rear face of the frame has a width extending from the component housing to an outer periphery and the elongate members have the same width as the width of the frame.

2. The digital display device according to claim 1 wherein:
   each elongate member is the same length as the respective adjacent side of the rear face against which that elongate member folds flat and the common axis traverses diagonally from a corner of the rear face of the frame to an opposing corner of the rear face of the frame.

3. The digital display device according to claim 1 wherein:
   the frame has a thickness extending from the front face of the frame to the rear face of the frame;
   the elongate members have a support thickness; and
   the thickness of the frame along said adjacent sides of the rear face of the frame against which the elongate members fold flat is less than the thickness of the frame elsewhere by an amount corresponding to the support thickness.

4. The digital display device according to claim 1 further including:
   a mechanism for securing the elongate members at one or both of a position folded flat to the rear face of the frame and hinged at an angle away from the rear face of the frame.

5. The digital display device according to claim 4 wherein:
   the mechanism includes a detent clip in at least one of the mounting portions.

6. The digital display device according to claim 4 wherein:
   the mechanism includes an over-centre mechanism in at least one of the mounting portions.

7. The digital display device according to claim 1 wherein:
   the mounting portions are arranged to allow the corner portion of the support to pivot around the hinged mounting portions to a position rearward beyond the component housing.

8. The digital display device according to claim 1 wherein the digital display device is one of:
   an ornamental frame, a camera, a mobile telephone, a television device, a portable game device, an audio player, an audio/visual player, or a lifestyle mobile device.

9. A method of supporting a digital display device having an electronic display screen with a front face and a rear face, the front face being configured to display images, a component housing holding processing components for driving the electronic display to display images, the housing being positioned at the rear face of the electronic display screen and a frame having a front face with four respective sides together surrounding the front face of the electronic display screen and having a rear face with four corresponding respective sides together defining an opening through which said component housing extends rearward from the electronic display screen and having a width extending from said component housing to an outer periphery, the method including:
   providing, as a support, two elongate members extending from a corner portion in two mutually perpendicular directions to respective mounting portions, said elongate members having the same width as the width of the frame; and hinging the mounting portions respectively to two adjacent sides of the rear face of the frame along a common axis and at respective positions so as to allow the elongate members to fold flat to the rear face of the frame alongside the component housing.

10. The method according to claim 9, wherein:
the mounting portions are hinged along a common axis which traverses diagonally from a corner of the rear face of the frame to an opposing corner of the rear face of the frame.

11. The digital display device according to claim 2 wherein:
the mounting portions are adjoined to the rear face of the frame at a position, along the common axis, corresponding to a top corner of the rear face of the frame and an opposing bottom corner of the rear face of the frame.

12. The digital display device according to claim 2 wherein:
the corner portion is aligned with another corner of the rear face of the frame when the elongate members are folded flat to the rear face of the frame.

\* \* \* \* \*